United States Patent [19]
Yamada et al.

[11] Patent Number: 4,812,980
[45] Date of Patent: Mar. 14, 1989

[54] MAP DISPLAY SYSTEM

[75] Inventors: Takeshi Yamada, Seto; Hidetoshi Fujimoto, Toyokawa; Kenzo Ito, Okazaki; Kazunori Hanabusa, Kasugai, all of Japan

[73] Assignee: Nippondenso Co., Ltd., Kariya, Japan

[21] Appl. No.: 863,520

[22] Filed: May 15, 1986

[30] Foreign Application Priority Data

May 16, 1985 [JP] Japan ............................... 60-104637

[51] Int. Cl.$^4$ ..................... G06F 15/50; G09B 29/00
[52] U.S. Cl. .................................. 364/449; 340/990; 340/995
[58] Field of Search ............... 364/424, 443, 449, 460, 364/521; 73/178 R; 340/988, 990, 995; 342/450–452

[56] References Cited

U.S. PATENT DOCUMENTS

| | | | |
|---|---|---|---|
| 4,504,913 | 3/1985 | Miura et al. | 364/449 |
| 4,511,973 | 4/1985 | Miura et al. | 364/449 |
| 4,532,514 | 7/1985 | Hatano et al. | 340/995 |
| 4,571,684 | 2/1986 | Takanabe et al. | 364/449 |
| 4,646,089 | 2/1987 | Takanabe et al. | 364/424 |

FOREIGN PATENT DOCUMENTS 0118886  9/1984  European Pat. Off. ............ 364/424

OTHER PUBLICATIONS

"The 44th Study Meeting" Sep. 5, 1984, Mitsubishi Elec. Corp. pp. 7–9.

Primary Examiner—Gary Chin
Attorney, Agent, or Firm—Cushman, Darby & Cushman

[57] ABSTRACT

In a map display system, map-forming data necessary for display of a display area and character data representing display areas are stored in a map data memory. A display area commander reads map-forming data indicating a specified display area out of the map data memory, and produces a display area instruction. A display character commander selects character data for a given point of the specified display area designated by the display area designation commander, and produces a display character instruction. On the basis of the display area instruction from the display area commander and the display character instruction from the display character commander, a map of the specified display area and characters in the specified display area are displayed on a display.

3 Claims, 9 Drawing Sheets

FIG. 3

| DISPLAY CHARACTERS | DISPLAY CHARACTER CODE | POSITIONAL X COORDINATE | POSITIONAL Y COORDINATE | PILOT CODE DISPLAY SCALE | SINGLE-CHARACTER DISPLAY SCALE | DOUBLE-CHARACTER DISPLAY SCALE | THREE-CHARACTER DISPLAY SCALE | n-CHARACTER DISPLAY SCALE |
|---|---|---|---|---|---|---|---|---|
| ABC CITY | | | | | ″ | ″ | ″ | ″ |
| DEFG | ″ | ″ | ″ | ″ | ″ | ″ | ″ | ″ |
| HIJK | ″ | ″ | ″ | ″ | ″ | ″ | ″ | ″ |
| MNO | ″ | ″ | ″ | ″ | ″ | ″ | ″ | ″ |

MAP DISPLAY SYSTEM

BACKGROUND OF THE INVENTION

The present invention relates to a map display system for guiding a vehicle such as a car.

Various suggestions have been made about a map display system of this type in the prior art.

An example is disclosed in Japanese Patent Laid-Open Publication No. 164583/84 invented by the present applicant. In this system, map pattern data providing the basis of display of roads and the like on a display screen and character data providing names of municipalities, roads and the like are both stored as code data, so that with the driving of the vehicle, map patterns and descriptive characters are indicated on the display screen automatically or by the operation of the driver.

Indication of all character data included in a given map area on display makes it difficult to see the map as a great number of display data characters are involved. For this reason, there is needed some display limitation.

SUMMARY OF THE INVENTION

The object of the present invention is to provide a map display system in which character data are provided as a data base independent of data for preparing a map, so that characters are displayed always in the same size regardless of the scale of the map which may be enlarged or reduced by a map display designation on the one hand, and the characters are made easily recognizable on the other hand. That is the interval between characters is kept constant.

In order to achieve the above-mentioned object, according to the present invention, there is provided, as shown schematically in FIG. 1, a map display system comprising map data memory means for storing map-forming data required for display of each display area and character data corresponding to each of said areas; display area designation means for reading the map-forming data corresponding to a specified display area from said map data memory means and producing a display area instruction; display character designation means for selecting only the character data corresponding to defined components constructing the specific display area designated by said display area designation means and producing a display character instruction; and display means for displaying the map of the specified display area in response to the display area instruction from said display area designation means and displaying characters in response to the display character instruction from said display character designation means in said display area.

A map display system further comprises character form control means for maintaining the size of the characters displayed on the display means and the interval between characters to a fixed level regardless of the display scale of the display area.

A map display system further comprises number-of-characters control means for changing the number of characters displayed on the character display means in accordance with the scale of the display area.

BRIEF DESCRIPTION OF THE DRAWINGS

FIG. 3 shows a data configuration of character data.

DESCRIPTION OF THE PREFERRED EMBODIMENTS

Figure 1:
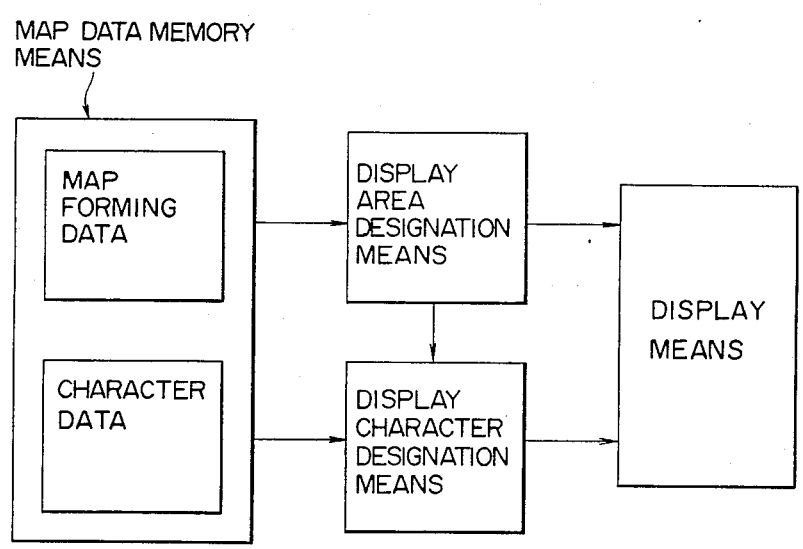
FIG. 1 is a block diagram showing a configuration of the present invention.
Figure 2:
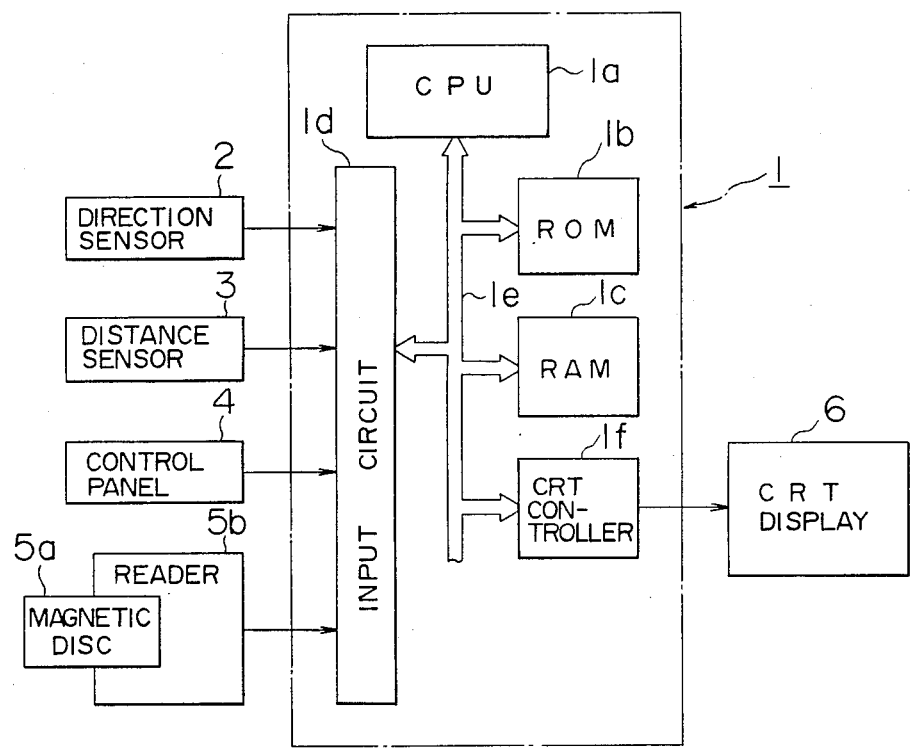
FIG. 2 is a block diagram showing an embodiment of the present invention.

A configuration of an embodiment of the map display system according to the present invention is shown in FIG. 2. In this map display system, a system 1 includes a well-known microcomputer having a CPU $1a$, a ROM $1b$, a RAM $1c$, an input port $1d$ and a common bus $1e$, and a CRT controller $1f$. The system further comprises input means including a direction sensor 2 for detecting the direction in which the vehicle is running, a distance sensor 3 for detecting the distance covered by the vehicle, a control panel 4 operated by the driver, and a reader $5b$ with a replaceable magnetic disc $5a$, which input means are electrically connected to the system proper, and output means including at least a CRT display 6 electrically connected thereto for displaying map patterns such as roads and characters.

The direction sensor 2 includes an annular permalloy core, an excitation coil and two coils intersecting each other at right angles, and produces a direction signal for detecting the vehicle running direction against the earth's magnetism on the basis of the output voltage of the two coils.

The distance sensor 3 detects the revolutions of a speed meter cable indirectly as an electrical signal through a reed switch, a magnetically sensitive element or a photoelectric cell, or detects the revolutions of the output shaft of the transmission as an electrical signal in a similar manner, thereby producing a distance signal used for computing the distance covered by the vehicle.

The control panel 4 includes at least a switch (not shown) for supplying and interrupting power to the map display system from a battery mounted on the vehicle, enlargement and reduction keys (not shown) which are operated by the driver for designating an enlarged or reduced display of the map, and a display key (not shown) which is operated by the driver for designating the display of a description on the screen of the CRT display 6.

The magnetic disc $5a$ stores map patterns as pattern data and character data corresponding to appropriate geographic points on the map as code data. Assume that characters "ABC City", "DEFG", "HIJKL" and "MNO" are to be displayed, for example. As shown in FIG. 3, each of the character data is made up of a set of data elements including a display character code, an X coordinate of the position, a Y coordinate of the position, a pilot code display scale, a single-character display scale, a double-character display scale, a three-character display scale, . . . . . , a n-character display scale.

Figure 4:
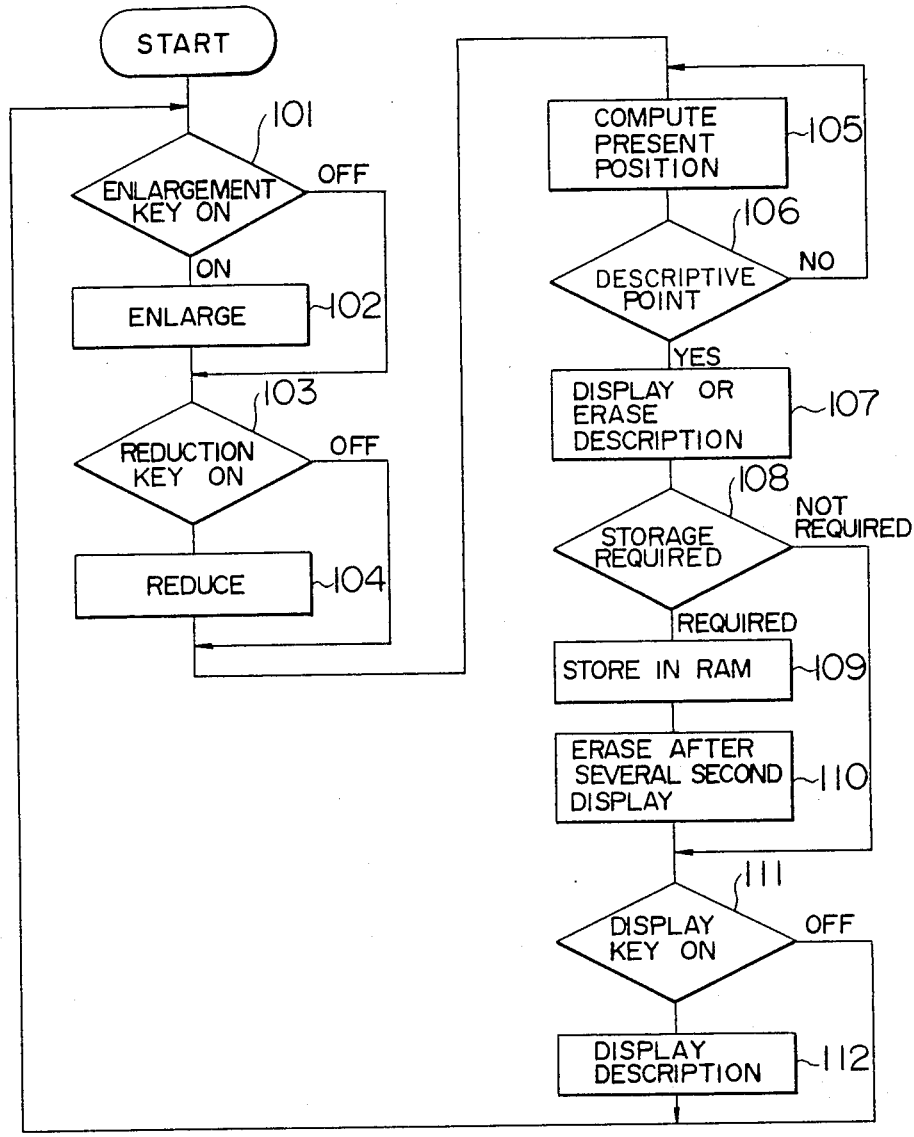
FIGS. 4 and 5 are flowcharts for explaining the processing operation of a CPU.

The ROM $1b$ of the system proper has a program stored therein by which the CPU $1a$ executes the processes shown in the flowchart of FIG. 4.

The CPU $1a$ repeatedly executes the processes (1) to (12) described below.

(1) Whether or not the enlargement key is turned on (step 101 in FIG. 4) is decided.

(2) If it is decided that the enlargement key is turned on, the enlargement process is executed (step 102). The specific operation of the enlargement process will be described later.

(3) After execution of this enlargement process, or if it is decided that the enlargement key is not turned on by the step 101, then it is decided whether or not the reduction key has been turned on (step 103).

(4) If it is decided that the reduction key has been turned on, the reduction process is executed (step 104).

(5) After execution of the reduction process or if it is decides at step 103 that the reduction key has not been turned on, then the direction signal from the direction sensor 2 and the distance signal from the distance sensor 3 are received to compute the present position of the vehicle in a well-known manner (step 105).

(6) The present position obtained by the above computation is compared with the geographic point corresponding to the descriptive data, that is, the descriptive point thereby to decide whether or not the present position coincides with the descriptive point (step 106).

(7a) If it is decided that the present position does not coincide with the descriptive point, the process is passed to the computation of the present position (step 105).

(7b) If it is decided that the present position coincides with the descriptive point, on the other hand, the description based on the descriptive data corresponding to this descriptive point is displayed on the screen of the CRT display 6 through the CRT controller 1f or the description on display on the screen of the CRT display 6 is erased (step 107).

(8) It is decided whether or not the abovementioned description is the one required to be stored in the RAM 1c, such as a radio broadcasting station with the receiving frequency thereof or a telephone number of JAF (step 108).

(9) If it is decided that the description is the one to be stored, the particular descriptive data is stored in the RAM 1c (step 109), and the description, after being displayed for several seconds on the screen of the CRT display 6 through the CRT controller 1f, is erased (step 110).

(10) After the end of the process of the step 110, or after it is decided at step 109 that the description involved is not the one required to be stored such as "Narrow road" or "Beware of falling stone", then it is decided whether or not the display key has been turned on by a signal from the display key on the control panel 4 (step 111).

(11) If it is decided that the display key has been turned on, the description based on the descriptive data stored in the RAM 1c is displayed on the screen of the CRT display 6 through the CRT controller 1f (step 112).

(12) After execution of, the process of the step 112, or if in the step 111 it is decided that the display key has not been turned on, then process is passed to the step 101 for deciding whether the enlargement key has been turned on or not.

Figure 5:
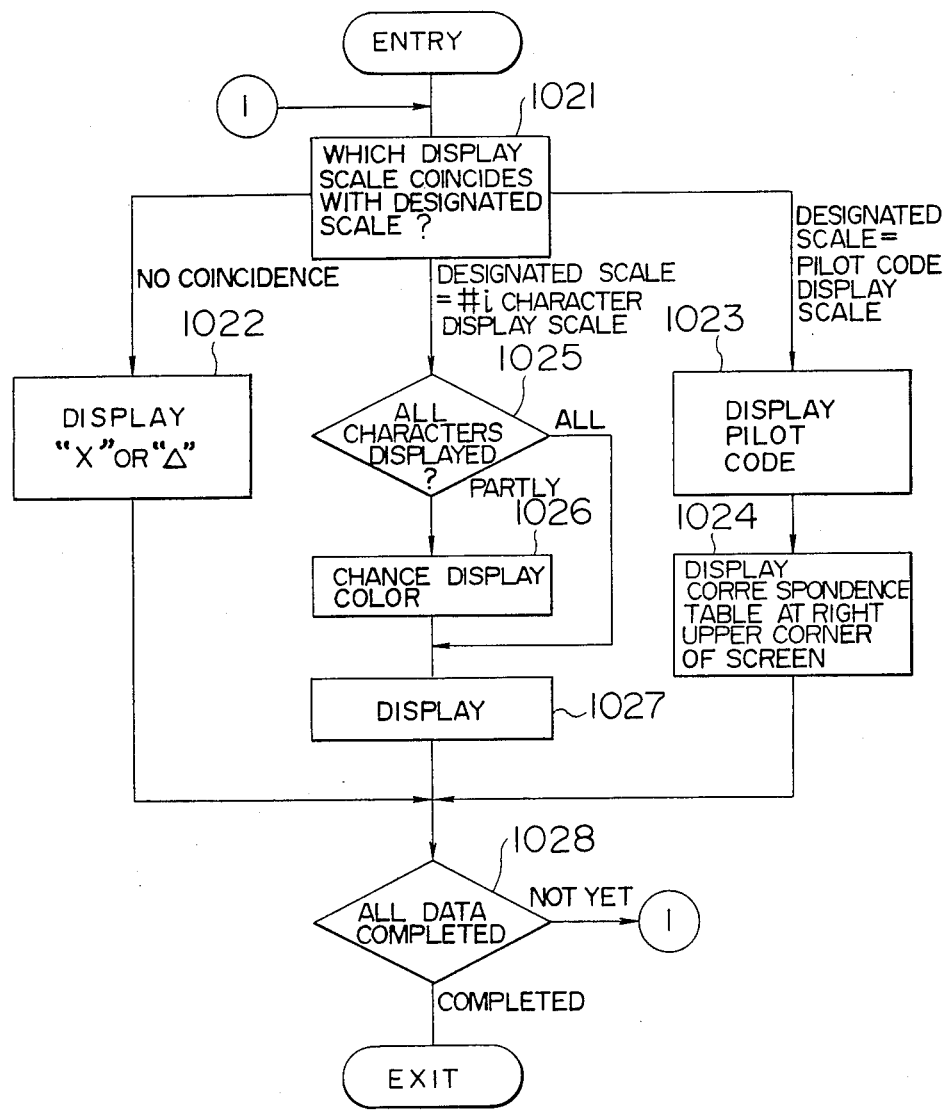

Essential parts of the aforementioned enlargement processes are specifically shown in FIG. 5. These processes will be explained below.

(1) A display scale coincident with the scale designated by the enlargement key operation is determined (step 1021). In other words, it is decided whether or not the designated scale coincides with the pilot code display scale, the one-character display scale, the two-character display scale, the three-character display scale, ..... or the n-character display scale, or it does not coincide with any of the display scales. This step 1021 is executed only for one of a plurality of display characters once each time of process.

(2a) If the designated scale fails to coincide with any of the display scales, the positional coordinate (x, y) determined in advance in correspondence with the display character is transferred to the display screen, and the mark "X" or "Δ" is attached to the coordinate position (step 1022).

(2b) When the designated scale coincides with the pilot code display scale, on the other hand, the pilot code is displayed at the display coordinate position in the same manner as above (step 1023). At the same time, a correspondence table is displayed at the upper right corner of the screen as viewed from the operator (step 1024). This correspondence table is displayed in such a form as "a: ABC City" if the display characters are "ABC City" and the pilot code is "a", for example.

(2c) If the designated scale coincides with the i-character display scale, such as the double-character display scale, for instance, it is decided whether these two characters coincide with all the display characters (step 1025). Assuming that the display characters are "ABC City", for instance, the characters involved are seven in all, and therefore it is decided that they fail to coincide with each other, so that the display color is changed (step 1026). This display color change is a process for changing the color of the characters to be displayed next. After this display color change or the step 1025 decides that all the characters coincide, the characters to be displayed are displayed in color at the display coordinate position (step 1027).

(3) After the process of (2a), (2b) or (2c) above, it is decided whether or not the process has been completed for all the display characters (step 1028), and if all the data is not completely processed, the step 1021 is executed again for the next display characters. If all the data is completely processed, by contrast, this routine is left.

Figure 6:
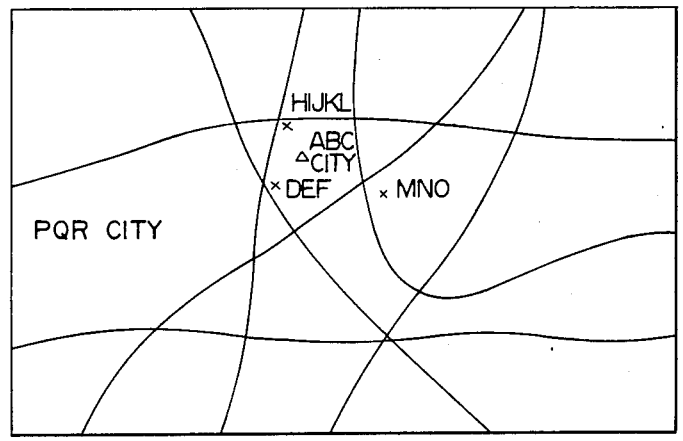
FIGS. 6 to 11 are diagrams showing forms of map and display screens for explaining the transfer of screen display forms.
Figure 7:
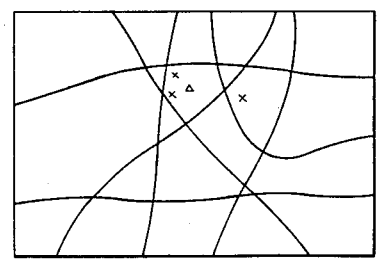
Figure 8:
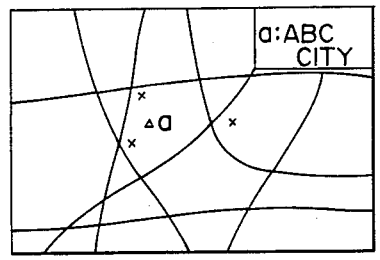
Figure 9:
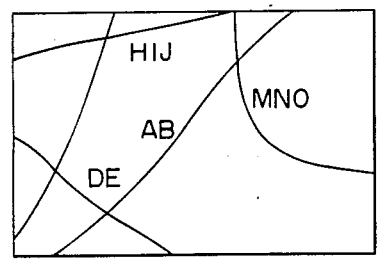
Figure 10:
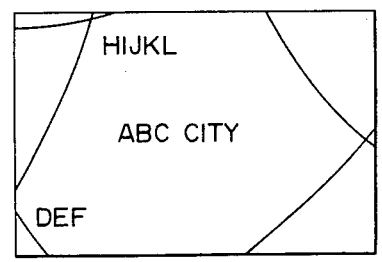

In parallel to this enlargement process, the form of display screen described below is achieved according to the designated scale. Specifically, in the case of a map comprising patterns and characters as shown in FIG. 6, assume that the designated scale is minimum, that is, display of the whole map is designated. In view of the fact that roads are so densely located that a character display thereof is not legible, only the marks "X" and "Δ" are attached at the display positions based on the coordinate (x, y) as shown in FIG. 7. In the case of a designated scale a rank higher, the pilot code "a" is displayed only for ABC City, together with the correspondence table "a: ABC City" at the upper right corner at the same time as shown in FIG. 8. Further, on the other hand, "AB" alone of "ABC City", "DE" alone of "DEFG" and "HIJ" alone of "HIJK" are displayed as shown in FIG. 9, while at the same time displaying the whole of "MNO". If the designated scale is a greater rank, the whole of "ABC City" and "HIJKL" and "DEF" alone of "DEFG" are displayed as shown in FIG. 10. As can be seen from these figures, the interval between adjacent characters remains the same regardless of the scale of the map.

Now, explanation will be made of the manner in which the display form of the screen of the CRT display 6 undergoes a change with the progress of the vehicle with reference to the steps 105 to 112 in the flowchart of FIG. 4 described above.

The roads displayed on the screen of the CRT display 6 have descriptive points (P2, P3, P4, ...) for displaying service data of various types, so that sentences of the descriptive data are displayed on the screen of the CRT display 6 when the vehicle passes each descriptive point.

Figure 11:
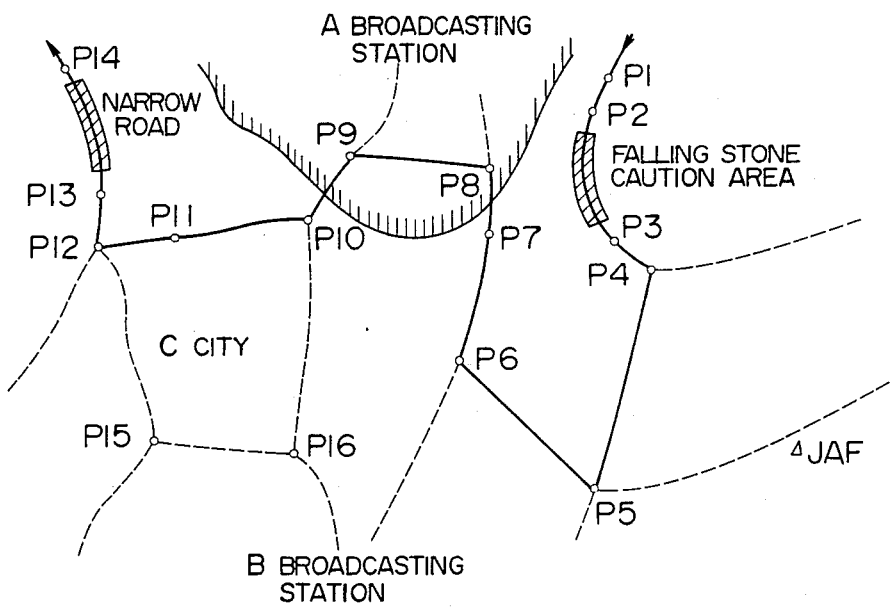

(1) When the vehicle having passed the point P1 shown in FIG. 11 reaches the descriptive point P2, the data "Beware of falling rock" is displayed at a part of the screen, such as at the lower part thereof.

(2) Subsequently when the vehicle having passed the point where he was warned against falling rock reaches the descriptive point P3, the display "Beware of falling rock" is erased.

(3) Subsequently when the vehicle reaches the descriptive point P4, the telephone number of JAF (corresponding to AAA) such as "JAF ΔΔ- 0000" is displayed for several seconds.

(4) Subsequently when the vehicle reaches the descriptive point P7 through the points P5 and P6, the receiving frequency such as "A broadcasting station xxxxx KHz" is displayed for several seconds.

(5) After that, when the vehicle reaches the descriptive point P9 through the point P8, the receiving frequency "B broadcasting station 0000 KHz" is displayed for several seconds.

(6) Then, when the vehicle reaches the descriptive point P13 through the points P10, P11 and P12, "Narrow road" is displayed at a part of the screen.

(7) After that, when the vehicle reaches the descriptive point P14 through the narrow road, the display "Narrow road" is erased.

As described above, in the case where a vehicle makes progress as shown in FIG. 11, the display form of the screen changes as specified from (1) to (7) with the progress of the vehicle. However, if the display key of the JAF telephone number or other key is operated after the vehicle has passed the descriptive point P4, for instance, the telephone number of JAF or the related data, as the case may be, is displayed by the operation of the display keys.

The steps 106 to 112 in the flowchart of FIG. 4 will be explained more in detail below.

As shown in Table 1, the display data, designation codes and type codes are stored in the magnetic disc 5a in correspondence with the coordinate data of the respective descriptive points (P2, P3, P4, ...).

TABLE 1

| Position of descriptive point | DESCRIPTIVE POINT DATA | | |
|---|---|---|---|
| | Display data | Type code | Designation code |
| P2 ($x_{p2}$, $y_{p2}$) | Beware of falling rock | 1 | 1 |
| P3 ($x_{p3}$, $y_{p3}$) | "Beware of falling rock" cancelled | 1 | 2 |
| P4 ($x_{p4}$, $y_{p4}$) | JAF ΔΔ-OOOO | 2 | 3 |
| P7 ($x_{p7}$, $y_{p7}$) | A broadcasting station xxxx KHz | 3 | 3 |
| P9 ($x_{p9}$, $y_{p9}$) | B broadcasting station xxxxx KHz | 3 | 3 |
| . | . | . | . |
| . | . | . | . |
| . | . | . | . |
| P13 ($x_{p13}$, $y_{p13}$) | Narrow road | 1 | 1 |
| P14 ($x_{p14}$, $y_{p14}$) | "Narrow road" | 1 | 2 |

TABLE 1-continued

| Position of descriptive point | DESCRIPTIVE POINT DATA | | |
|---|---|---|---|
| | Display data | Type code | Designation code |
| | cancelled | | |

Figure 12:
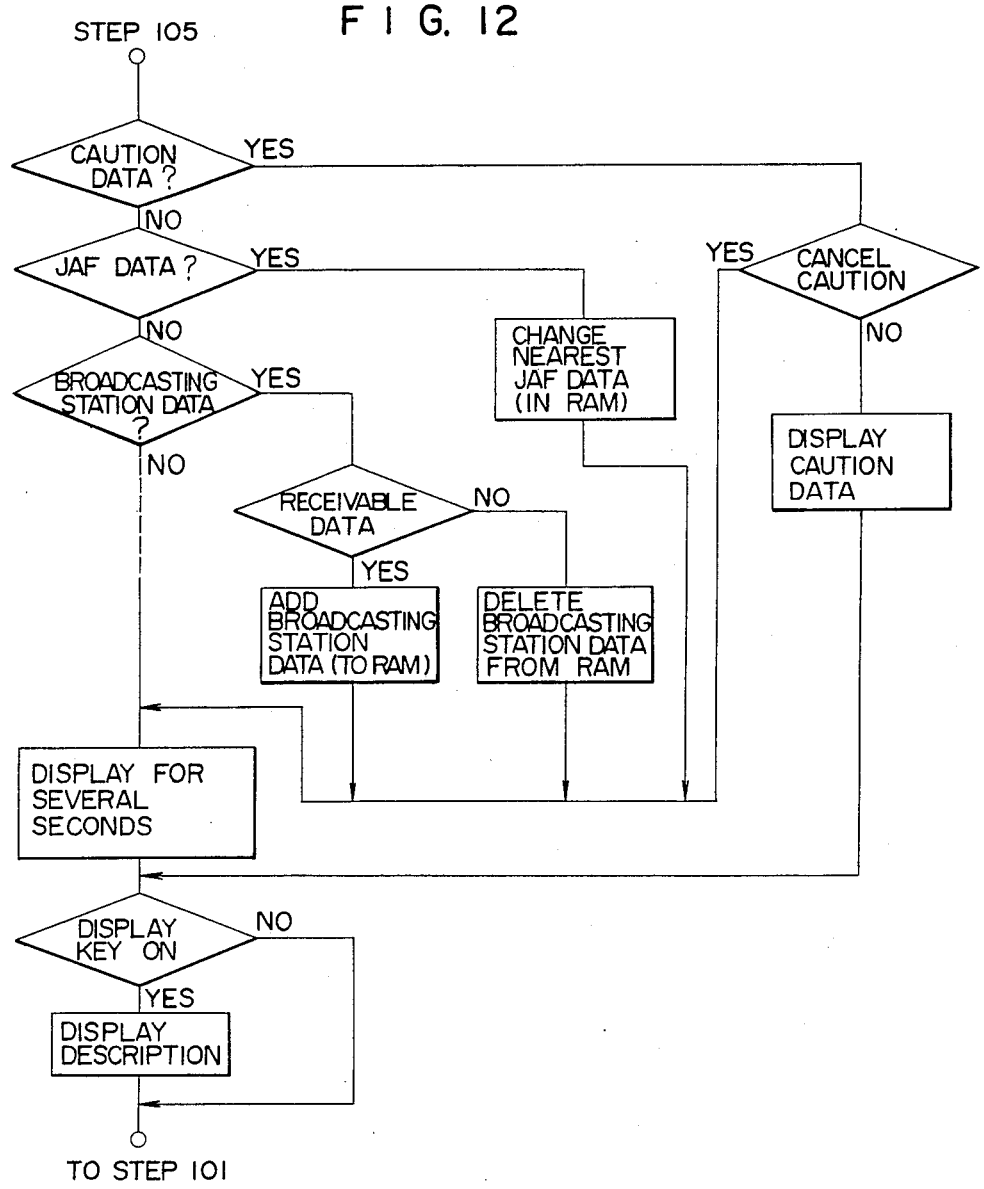
FIG. 12 is a flowchart showing displays of display data according to type codes and designation codes of descriptive data.

DESIGNATION CODES:
1: Data displayed while a caution instruction is issued.
2: Data for designating the cancellation of the data on display. Displayed for several seconds.
3: Data displayed for several seconds and stored the RAM data. This data becomes an object of operation display.
TYPE CODES:
1: Caution data
2: JAF data
3: Broadcasting station data The descriptive data shown in Table 1 are processed in accordance with the flow chart shown in FIG. 12. In the flowchart of FIG. 12, the display data is displayed and stored in the RAM 1c in accordance with the designation code and the type code of each descriptive data. The caution data with the type code of "1", for instance, is not required to be displayed after the vehicle has passed the particular point, and therefore is not stored in the RAM 1c. As to the JAF data or the broadcasting station data with the type code of "2, 3", however, they are stored in the RAM 1c, since the telephone number of JAF or the receivable frequency of the broadcasting stations is necessary in case of emergency even after the particular descriptive point has been passed. When the user operates the display keys, therefore, the descriptive data is read out and displayed from the RAM even after the particular descriptive point has been passed.

Storage addresses corresponding to each descriptive data are predetermined in the RAM, and they are rewritten as the latest data each time the descriptive points are passed.

In the case where the data in the RAM is displayed at step 112, only that data with the type code of "2" or "3" is picked up from Table 1 and displayed. The display keys may be adapted for displaying each type code each time of operation thereof.

We claim:
1. A map display system comprising:
memory means for storing map-forming information required for display of a map of a predetermined area and storing coordinates of a predetermined spot within said predetermined area and a display character code representing the name of the predetermined spot, said display character code being formed by a plurality of letters, the entirety of each said display character code being associated with said coordinates of said predetermined spot corresponding to said display character code;
designating means for designating a scale of the map;
display means for displaying the map; and
display control means for reading out the mapforming information from said memory means and for causing said display means to display the map of the scale designated by said designating means, said display control means further causing said display means, in accordance with the coordinates and the display character code of the predetermined spot stored in said memory means, to perform a character display of said name on a position corresponding to said coordinates of the predetermined spot on the map displayed by said display means, said character display being positioned in accordance with the coordinates of the predetermined spot, the size of the characters and an interval between adjacent characters being maintained at a fixed value regardless of the scale designated by said designating means.

2. A system according to claim 1, wherein said display control means comprises means for causing said display means to display a mark indicating a position of the predetermined spot at a position corresponding to said coordinates of the predetermined spot on the map displayed by said display means, and for causing the character display of the name of the predetermined spot on a predetermined display portion of the display means using the display character code stored in said memory means.

3. A system according to claim 1, wherein said display means comprises means for changing the number of displayed characters of a name to be displayed in accordance with the scale designated by said designating means.

* * * * *